United States Patent Office 2,809,125
Patented Oct. 8, 1957

2,809,125

METHOD OF PRODUCING PLASTIC FLOOR COVERING

James E. Hazeltine, Jr., Lancaster, Pa., assignor to Armstrong Cork Company, Lancaster, Pa., a corporation of Pennsylvania No Drawing. Application March 24, 1954, Serial No. 418,459

1 Claim. (Cl. 117—47)

This invention relates to plastic floor coverings. More particularly, the invention relates to a method of producing a floor covering having a decorative wearing surface containing a vinyl resin produced by depositing a thin film of vinyl resin onto a carrier which is a saturated felt having an asphalt saturant and which may be coated with a composition containing filler and selected resins and rubberlike polymers.

Felt base floor coverings are well known to the art and, generally speaking, comprise a saturated felt backing, a seal coat, and a paint film which serves as both a decorative and wearing surface. One widely used method of producing such floor coverings includes the step of face coating a saturated felt sheet with a coating paint by means of a knife or other suitable apparatus to produce what is known in the art as a "seal coat." Following the application of the seal coat, the material is passed through a block printing apparatus. The blocks are dipped into a container of decorative material and various designs are applied by means of the blocks to the coated felt base. Following the application of the decorative top coat, the material is suspended in stoves to dry the paint film. The paints employed, because of the manner in which they are applied, are called "print paints"; and in the art, the goods are known as "printed felt base" goods.

In recent years, felt base floor coverings such as printed felt base floor coverings have been produced utilizing particular types of vinyl resin dispersions as a decorative top coating. These top coats are advantageously deposited over specially prepared seal coats, which may be a mixture of selected rubberlike polymers and selected vinyl polymers to which have been added filler materials.

In order to obtain the properties required in a material which is to be employed as a floor or wall covering, it is necessary to heat the product resulting from the printed operation to elevated temperatures substantially higher than those normally employed when the more conventional print paints are used. These temperatures are sufficiently high to fuse or cure the decorative top coat. For example, temperatures above about 300° F., such as about 300° F. to 400° F., may be attained in the fusing or curing operation.

In the manufacture of printed felt base floor coverings, probably the most widely employed backing material is a felt which has been saturated with asphalt. Such saturated felts prior to this invention have been unsuitable for use in the production of floor coverings, which includes a step of heating a product at comparatively high temperatures such as those essential to fuse or cure the wearing surface. At such high temperatures, the asphalt saturant tends to exude from the saturated felt and form an unsightly sticky deposit on the back surface of the floor covering. Such floor coverings are unfit for sale.

I have found that asphalt saturated felt backing material may be rendered suitable for use in the production of a printed floor covering which requires heating at high temperatures by baking the felt at temperatures sufficiently high to drive off volatile materials contained therein but below the temperature at which exudation of the asphalt would normally occur. I believe that the presence of moisture and other volatile materials in the felt is the reason why the asphalt exudes therefrom at the high temperatures of fusion of the wearing surface.

In accordance with my invention, the raw felt is saturated with asphalt advantageously by passing a sheet of the felt through a tank containing the saturant or, if desired, the saturant may be deposited upon the fibers in a beater in accordance with the well-known beater saturating technique. After saturation of the felt material, the seal coat is applied and dried. The resulting seal coated saturated sheet is then baked at a temperature sufficiently high to drive off the volatile materials entrapped or absorbed by the asphalt saturated felt but insufficiently high to cause exudation of the asphalt. Generally speaking, it is advantageous to bake the saturated sheet at temperatures such as about 150° F. to 200° F. for about 4 to about 12 hours. The time of baking, of course, depends upon the temperature conditions obtaining. Any suitable baking oven may be employed, and an advantageous means of accomplishing the baking is to suspend battens of the saturated felt in linoleum and printed felt base stoves. If desired, drying of the seal coat and baking may be carried out in a single application, provided, of course, the necessary baking conditions can be attained.

It is advantageous in the production of floor coverings having vinyl resin decorative wearing surfaces or top coats to employ a seal coat containing an inherently tacky compound, which serves to enhance adhesion between the coating paint and the saturated felt, and a reinforcing agent, which is a resinous vinyl type polymer and which serves to build up the internal strength of the coating paint; and because of chemical similarities to the vinyl resin wearing surface, to enhance adhesion between the seal coat and the wearing surface. If desired, in order to improve the appearance of the product, a smoothing coat, which may be an oleoresinous binder mixed with filler and pigment, may be interposed between the saturated felt and the seal coat. The seal coat also contains an excess of filler material to enhance the laminate strength by affording a microscopically roughened surface. Generally speaking, the seal coat contains about 20% to about 50% of a rubberlike component admixed with a vinyl resin reinforcing agent, together with about 80% to about 50% of an inert filler. The binder or rubber-resin mixture advantageously contains about 50% to about 80% rubberlike polymer and about 50% to about 20% reinforcing resin. It is also desirable to utilize a quantity of inert filler, which is no less than about 50% by weight of the coating paint composition. If less than about 50% filler is employed, the desired tooth or mechanical bond between the seal coat and adjacent surface is not obtained. When more than about 80% filler is employed, the seal coat possesses very little internal strength. Typical examples of tackifiers and reinforcing agents which may be used in forming the seal coat are as follows:

A. *Tackifiers*

(1) A styrene-butadiene copolymer containing 30–60 parts styrene and 70–40 parts of butadiene.
(2) An acrylonitrile-butadiene copolymer containing 55–80 parts of butadiene and 45–20 parts of acrylonitrile.
(3) An isobutylene-isoprene copolymer containing 97–99 parts of isobutylene with 3–1 parts of isoprene.
(4) A polychloroprene.

B. *Reinforcing agents*

(1) Polyvinyl chloride.

(2) A copolymer of polyvinyl chloride and polyvinyl acetate containing about 95–80 parts of polyvinyl chloride and about 5–20 parts of polyvinyl acetate.

(3) A polyvinyl chloride-polyvinylidene chloride copolymer containing a majority of polyvinylidene chloride.

(4) A styrene-butadiene copolymer containing 98–80 parts of styrene and 2–20 parts of butadiene.

(5) Polystyrene.

In each instance, about 1 to 3 parts of an inert filler, such as wood flour, micronized slate, whiting clay, and the like, are employed for each part of the binder or resin-rubberlike polymer mixture. It is believed that the binder may be described as a mixture of rubberlike polymer tackifier and a vinyl resin reinforcing agent.

After application of the seal coat to the saturated felt backing, the resulting material is then passed under a series of printing blocks which apply the decorative wearing surface in any desired pattern. Typical vinyl resin print paints as well as the seal coats which are advantageously used are described in Hazeltine United States Patent No. 2,624,682. These print paints comprise a basic or film-forming ingredient which is a vinyl resin such as polyvinyl chloride and copolymers of vinyl chloride and vinyl acetate which have average molecular weights above 16,000 as determined by Staudinger's method and contain vinyl chloride in the range of about 90% to about 97% by weight, as well as copolymers of vinyl chloride and dibutyl maleate, ethyl acrylate, methyl acrylate, butyl acrylate, methyl methacrylate, and butyl methacrylate, all containing substantially the same amount of combined vinyl chloride and having the same average molecular weight. In addition, copolymers of vinyl chloride and acrylonitrile containing about 45% to about 80% vinyl chloride may also be used, as well as certain copolymers of vinyl chloride and vinylidene chloride. Such resins may be described as polymers of vinyl chloride and copolymers of vinyl chloride containing at least 45% vinyl chloride.

A typical formulation for a decorative top coat is as follows:

EXAMPLE

| | Parts by weight |
|---|---|
| Titanium dioxide pigment | 80 |
| Lead chromate pigment | 16 |
| Dioctyl phthalate plasticizer | 136 |
| Vinyl chloride-vinyl acetate copolymer | 410 |
| Mineral spirits | 110 |
| Butylated urea-formaldehyde resin (60% solids in 50–50 butanol xylene) | 13.8 |

While the products of my invention are particularly suitable for use as floor coverings, it is also within the scope of the invention to employ the product of the process as wall coverings and as coverings for any surfaces, such as counters, shelves, and the like.

I claim:

In a method of producing surface coverings by applying a seal coat to an asphalt saturated backing material, drying said seal coated felt, depositing at room temperature a decorative wearing surface containing vinyl resin onto said seal coated felt, and fusing said decorative wearing surface, the improvement comprising heating said saturated felt subsequent to said drying step and prior to said depositing step to a temperature in the range of about 150°–200° F. for a period of about 4–12 hours to drive entrapped volatile material including moisture out of said asphalt saturated felted backing material, thereby preventing exudation of the asphalt during said fusing step.

References Cited in the file of this patent

UNITED STATES PATENTS

| | | |
|---|---|---|
| 1,297,009 | Prifold | Mar. 11, 1919 |
| 2,295,969 | Powers | Sept. 15, 1942 |
| 2,529,799 | Crockett | Nov. 14, 1950 |
| 2,624,682 | Hazeltine | Jan. 6, 1953 |
| 2,624,683 | Bezman | Jan. 6, 1953 |
| 2,696,447 | Bezman | Dec. 7, 1954 |